United States Patent
Maeda (10) Patent No.: US 8,189,700 B2
(45) Date of Patent: May 29, 2012

(54) SIGNAL GENERATION DEVICE AND SIGNAL GENERATION METHOD

(75) Inventor: Koji Maeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 255 days.

(21) Appl. No.: 12/627,315

(22) Filed: Nov. 30, 2009

(65) Prior Publication Data

US 2010/0135433 A1 Jun. 3, 2010

(30) Foreign Application Priority Data

Dec. 3, 2008 (JP) ................ P2008-309121

(51) Int. Cl.
*H04K 1/10* (2006.01)
*H04J 11/00* (2006.01)

(52) U.S. Cl. ........................ 375/260; 370/210

(58) Field of Classification Search .......... 375/260–262, 375/265, 267; 370/208, 210; 708/400–405
See application file for complete search history.

(56) References Cited

U.S. PATENT DOCUMENTS

| | | | |
|---|---|---|---|
| 2004/0008616 A1 | 1/2004 | Jung et al. | |
| 2006/0034385 A1* | 2/2006 | Egashira et al. | 375/267 |
| 2006/0227890 A1* | 10/2006 | Koga et al. | 375/260 |
| 2007/0147540 A1* | 6/2007 | Tzannes et al. | 375/295 |
| 2008/0026704 A1 | 1/2008 | Maeda et al. | |
| 2008/0043616 A1* | 2/2008 | Clausen et al. | 370/210 |
| 2008/0080628 A1* | 4/2008 | To et al. | 375/260 |
| 2009/0103648 A1* | 4/2009 | Fukuoka et al. | 375/267 |
| 2009/0168913 A1* | 7/2009 | Nakagiri | 375/260 |
| 2009/0264076 A1* | 10/2009 | Nogami et al. | 455/63.1 |
| 2010/0130221 A1* | 5/2010 | Imamura | 455/452.1 |

OTHER PUBLICATIONS

Paul D. Sutton, et al., "Cyclostationary Signatures in Practical Cognitive Radio Applications", IEEE Journal on Selected Areas in Communications (JSAC), 2008, 12 pages.

* cited by examiner

*Primary Examiner* — Young T. Tse
(74) *Attorney, Agent, or Firm* — Oblon, Spivak, McClelland, Maier & Neustadt, L.L.P.

(57) ABSTRACT

A signal generation device that employs a transmission method that uses inverse Fourier transform includes: a modulation unit configured to modulate transmission data to obtain modulation data; a serial-parallel conversion unit configured to convert the modulation data input in series to parallel data of a prescribed size smaller than the size of inverse Fourier transform; a duplication unit configured to select and duplicate all or a portion of the parallel data, to obtain duplication data; a phase rotation unit configured to rotate the phase of a signal point at a prescribed rate for the duplication data, to obtain phase rotation data; and an inverse Fourier transform unit configured to carry out inverse Fourier transform on the parallel data obtained from the serial-parallel conversion unit and the phase rotation data obtained from the phase rotation unit.

7 Claims, 10 Drawing Sheets

SIGNAL GENERATION DEVICE AND SIGNAL GENERATION METHOD

BACKGROUND OF THE INVENTION

1. Field of the Invention

The present invention relates to a signal generation device and a signal generation method that induces characteristics of second-order cyclostationarity in a communication system that carries out signal identification based on second-order cyclostationarity.

2. Related Background Art

In recent communication systems, communication has come to be carried out by recognizing communication status by gathering information on signals received by a terminal that has received a signal, analyzing the recognized communication status, and using signal transmission parameters that enable the attaining of communication quality (prescribed quality of a communication rate or error rate and the like) that is convenient for or desired by the terminal based on the results of that analysis. Moreover, studies have been conducted on environment recognition communication systems that carry out such communication particularly in the field of wireless communication. In addition, in environment recognition communication systems, gathering of information based on signal demodulation is considered to be typical for recognizing communication status at a terminal.

However, in the case of carrying out communication within the same area in which a plurality of systems is present having different communication methods, since signals cannot be mutually demodulated, although it is possible to recognize the state of "a signal being present" when a signal has been received, there is the problem of being unable to gather any information beyond that.

In contrast, techniques have been attracting attention that focus on signal statistics and gather information on received signals by calculating statistics. Among these techniques, studies have been conducted in particular on second-order cyclostationarity, which has fewer arithmetic operations. Second-order cyclostationarity refers to statistics that generate different characteristics for signals having different parameters, and the use thereof makes it possible to easily identify a plurality of signals having different communication methods. Thus, in the case of carrying out communication within the same area where a plurality of systems having different communication methods is present, in addition to information in the form of "a signal is present", information as to "which signal belonging to which system" can also be obtained when a signal has been received. However, even if this technique is used, there was still the problem of the amount of information obtained being extremely small and being inadequate for recognizing communication status.

Therefore, a technique has been studied that enables communication equipment to artificially induce a signal that generates characteristics of second-order cyclostationarity, and transmit a larger amount of information by means of artificially induced statistics. With regard thereto, reference may be made to, for example, U.S. Patent Publication No. 2008-0026704 (to be referred to as Reference 1) and P. D. Sutton, K. E. Nolan and L. E. Doyle, "Cyclostationary Signatures in Practical Cognitive Radio Applications", IEEE Journal on Selected Areas in Communications (JSAC), Vol. 26, no. 1, pp. 13-24, 2008 (to be referred to as Reference 2).

In Reference 1, a signal generation method is disclosed that imparts an ID to a wireless signal based on statistics. Paragraphs 64 to 73 of the specification of Reference 1 disclose a first wireless signal generation method that induces characteristics of cyclostationarity in a multi-carrier system by transmitting the same symbol for a plurality of prescribed subcarriers. In addition, paragraph 70 discloses a second wireless signal generation method that uses discrete sine wave symbols as transmitted symbols for a plurality of prescribed subcarriers. Moreover, paragraph 61 discloses a third wireless signal generation method that transmits duplicates of transmission data signals at different frequencies on a frequency axis. In Reference 2, a wireless signal generation method is disclosed that induces characteristics of cyclostationarity by duplicating data transmitted by a portion of subcarriers when using an Orthogonal Frequency Division Multiplexing (OFDM) system, and generating transmission signals by controlling input to inverse Fourier transform so that the same data is transmitted by other subcarriers as well.

The first wireless signal generation method in Reference 1 and the wireless signal generation method of Reference 2 generate signals having characteristics of cyclostationarity corresponding to a prescribed number of remote subcarriers by unifying the transmission signal of a certain subcarrier with signals transmitted by the prescribed number of remote subcarriers from that subcarrier. However, according to these inventions, since the types of cyclostationarity characteristics that can be induced is limited by the total number of subcarriers, there was the problem of it being difficult to transmit numerous types of information using characteristics of cyclostationarity.

In addition, in the second wireless signal generation method of Reference 1, since the transmission of discrete sine wave symbols is an element of this method, data cannot be transmitted by subcarriers used to induce cyclostationarity, thereby resulting in the problem of a large overhead relative to all signals.

Moreover, in the third wireless signal generation method of Reference 1, although transmission signals are duplicated and frequency-shifted signals are transmitted simultaneous to those transmission signals, in the case the transmission signals are generated by a signal generation method that uses inverse Fourier transform such as OFDM signals, orthogonality between subcarriers cannot be secured due to the frequency shift, thereby resulting in the problem of the potential for deterioration of demodulation performance on the reception side.

SUMMARY OF THE INVENTION

Therefore, in order to solve the above-mentioned problems, an object of the present invention is to provide a signal generation device and a signal generation method that secure orthogonality between subcarriers under conditions of employing a transmission method that uses inverse Fourier transform and induce various characteristics of second-order cyclostationarity with little overhead in a communication system that carries out signal identification based on second-order cyclostationarity.

In order to achieve the above-mentioned object, the signal generation device as claimed in the present invention is a signal generation device that employs a transmission method that uses inverse Fourier transform, provided with a modulation unit configured to modulate transmission data to obtain modulation data; a serial-parallel conversion unit configured to convert the modulation data input in series from the modulation unit to parallel data of a prescribed size smaller than the size of inverse Fourier transform; a duplication unit configured to select and duplicate all or a portion of the parallel data obtained from the serial-parallel conversion unit, to obtain duplication data; a phase rotation unit configured to rotate the phase of a signal point at a prescribed rate for the duplication data, to obtain phase rotation data; and an inverse Fourier transform unit configured to carry out inverse Fourier transform on the parallel data obtained from the serial-parallel conversion unit and the phase rotation data obtained from the phase rotation unit.

According to this configuration, since a symbol input to inverse Fourier transform is rotated by one symbol unit and phase is not rotated within a single symbol, orthogonality between subcarriers can be secured during reception and at the same time, frequency can be shifted by a specific frequency with respect to all signals. As a result, signals can be generated in which various characteristics of second-order cyclostationarity have been induced while reducing deterioration during demodulation. Furthermore, although overhead is present corresponding to the amount of duplication since data signals are duplicated, overhead can be reduced by half in comparison with the case in which both the original signals and duplicated signals are used to induce cyclostationarity.

Furthermore, the above-mentioned signal generation device is preferably further provided with a rotation rate control unit configured to control the rate of rotation at which the phase of the signal point is rotated by the phase rotation unit. As a result of employing this configuration, the rotation rate of the phase of a signal point can be controlled corresponding to the cyclostationarity characteristics desired to be induced, thereby making it possible to easily induce various cyclostationarity characteristics according to the requirements of the system.

In addition, the above-mentioned signal generation device is preferably further provided with a duplication target selection control unit configured to control selection of the parallel data targeted for duplication by the duplication unit. As a result of employing this configuration, the subcarrier targeted for duplication can be changed as desired, thereby making it possible to generate more diverse cyclostationarity characteristics.

In order to achieve the above-mentioned object, the signal generation device as claimed in the present invention is a signal generation device that employs a transmission method that uses inverse Fourier transform, provided with a modulation unit configured to modulate transmission data to obtain modulation data; a serial-parallel conversion unit configured to convert the modulation data input in series from the modulation unit to parallel data of a prescribed size smaller than the size of inverse Fourier transform; a phase rotation unit configured to rotate the phase of a signal point at a prescribed rate for all of the parallel data obtained from the serial-parallel conversion unit, to obtain phase rotation data; a subcarrier disposition control unit configured to select all or a portion of the phase rotation data and configured to dispose the selected phase rotation data and the parallel data obtained from the serial-parallel conversion unit to each subcarrier, to obtain disposed parallel data; and an inverse Fourier transform unit configured to carry out inverse Fourier transform on the disposed parallel data.

According to this configuration, since a symbol input to inverse Fourier transform does not change within a single symbol, orthogonality between transmission signal subcarriers is secured. In addition, as a result of rotating the phase of a signal point at a prescribed rate for all parallel data obtained from the serial-parallel conversion unit, frequency can be shifted by a specific frequency with respect to all signals. Moreover, since all or a portion of the phase rotation data is selected, and the selected phase rotation data and parallel data obtained from the serial-parallel conversion unit is disposed (rearranged) to each subcarrier, more diverse cyclostationarity characteristics can be generated according to the positional relationship of each subcarrier on a frequency axis.

Furthermore, the above-mentioned signal generation device is preferably further provided with a rotation rate control unit configured to control the rate of rotation at which the phase of the signal point is rotated by the phase rotation unit. According to this configuration, the rotation rate of the phase of a signal point can be controlled corresponding to the cyclostationarity characteristics desired to be induced, thereby making it possible to easily induce various cyclostationarity characteristics according to the requirements of the system.

However, the present invention can also be interpreted to be an invention relating to a signal generation method executed by the signal generation devices described above, and can be described in the manner indicated below. This signal generation method demonstrates actions and effects that are the same as the respectively corresponding inventions relating to a signal generation device.

The signal generation method as claimed in the present invention is a signal generation method that is executed by a signal generation device that employs a transmission method that uses inverse Fourier transform, and includes: a step of modulating transmission data to obtain modulation data; a step of converting the modulation data input in series to parallel data of a prescribed size smaller than the size of inverse Fourier transform; a step of selecting and duplicating all or a portion of the parallel data to obtain duplication data; a step of rotating the phase of a signal point at a prescribed rate for the duplication data, to obtain phase rotation data; and a step of carrying out inverse Fourier transform on the parallel data and the phase rotation data.

In addition, the signal generation method as claimed in the present invention is a signal generation method that is executed by a signal generation device that employs a transmission method that uses inverse Fourier transform, and includes: a step of modulating transmission data to obtain modulation data; a step of converting the modulation data input in series to parallel data of a prescribed size smaller than the size of inverse Fourier transform; a step of rotating the phase of a signal point at a prescribed rate for all of the parallel data, to obtain phase rotation data; a step of selecting all or a portion of the phase rotation data and disposing the selected phase rotation data and the parallel data to each subcarrier, to obtain disposed parallel data; and a step of carrying out inverse Fourier transform on the disposed parallel data.

According to the present invention, diverse second-order cyclostationarity characteristics can be induced with little overhead while ensuring orthogonality between subcarriers under conditions of employing a transmission method that uses inverse Fourier transform.

DESCRIPTION OF THE PREFERRED EMBODIMENTS

The following provides an explanation of embodiments as claimed in the present invention in the order thereof with reference to the drawings.

First Embodiment

Configuration of Signal Generation Device

Figure 1:
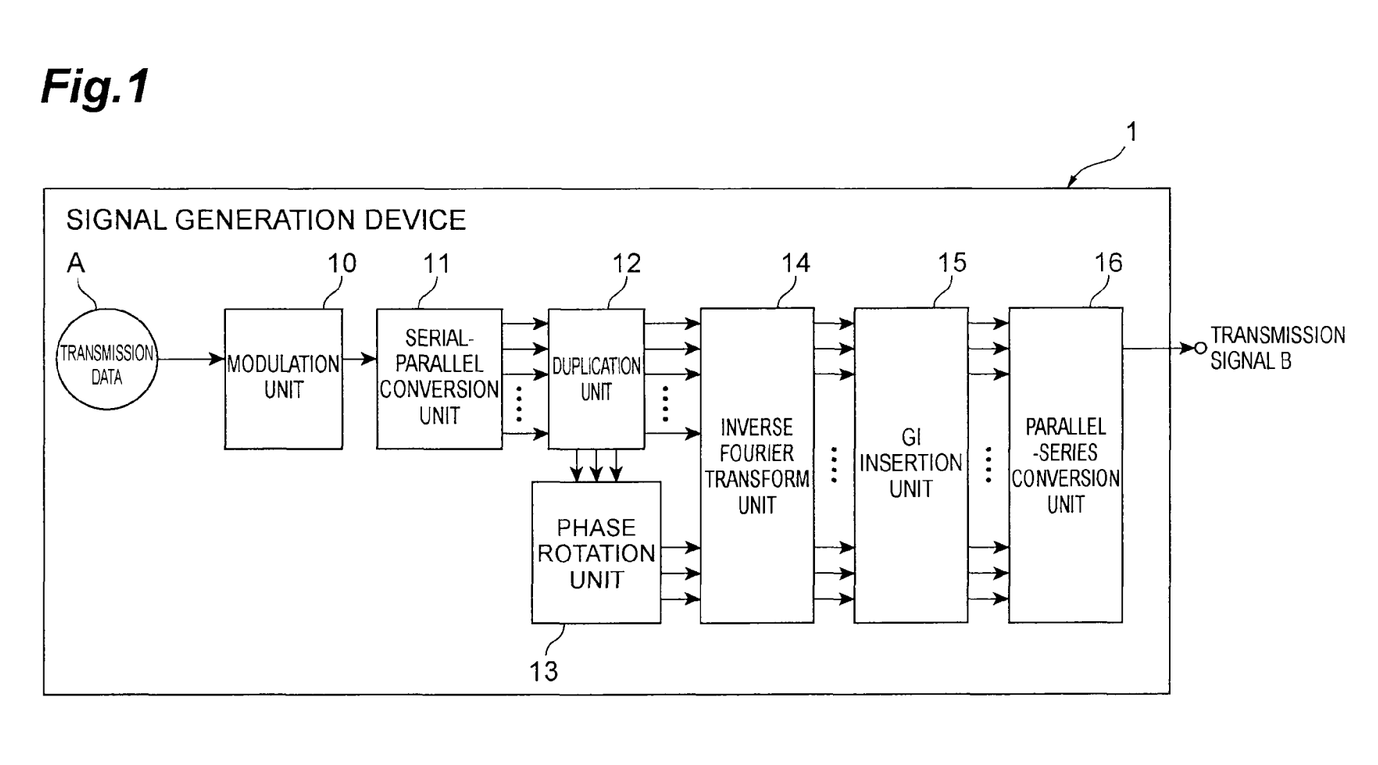
FIG. 1 is a block diagram representing the functional configuration of a signal generation device in a first embodiment.

First, an explanation is provided of the configuration of a signal generation device in a first embodiment. FIG. 1 is a block diagram representing the functional configuration of a signal generation device 1 in a first embodiment. As shown in this FIG. 1, the signal generation device 1 is provided with a modulation unit 10, a serial-parallel conversion unit 11, a duplication unit 12, a phase rotation unit 13, an inverse Fourier transform unit 14, GI insertion unit 15 and parallel-series conversion unit 16.

The following provides a detailed explanation of each constituent using FIG. 1.

The a modulation unit 10 modulates transmitted data A (to be referred to as "transmission data A") to obtain modulation data. Here, modulation refers to a technique for mapping transmission data on a signal space composed of an in-phase component and an orthogonal component in accordance with a modulation method such as phase modulation (such as BPSK or QPSK), amplitude modulation (such as PAM) or quadrature amplitude modulation (QAM).

The a serial-parallel conversion unit 11 generates parallel data by converting modulation data output in series obtained from the modulation unit 10 to parallel data. For example, when series modulation data output from the modulation unit 10 was of a series of length M as indicated below:

$$x = [x_1, x_2, \ldots, x_M] \quad (1)$$

then modulation data is divided into lengths N (<M) and converted to parallel data by arranging in the manner shown below.

$$X_p = \begin{bmatrix} x_1, & x_2, & \ldots, & x_N \\ x_{N+1}, & x_{N+2}, & \ldots, & x_{2N} \\ \vdots & \vdots & \ldots, & \vdots \\ x_{(\lceil M/N \rceil - 1)N+1}, & x_{(\lceil M/N \rceil - 1)N+2}, & \ldots, & x_{\lceil M/N \rceil N} \end{bmatrix} \quad (2)$$

At this time, in the case M cannot be evenly divided by N, predetermined dummy data is inserted for elements following $x_{M+1}$, and a matrix is generated of the size $\lceil M/N \rceil \times N$ to obtain parallel data. Furthermore, the expression $\lceil a \rceil$ represents the smallest integer that exceeds a. In addition, N is such that N is always less than $N_F$ ($N < N_F$) when the size of inverse Fourier transform is, for example, $N_F$.

The a duplication unit 12 obtains duplication data by duplicating all or a portion of row data of the matrix given as parallel data. For example, in the case of duplicating data from the first row to the second row of the above-mentioned matrix data, duplication data is generated in the form indicated below.

$$X_{copied} = \begin{bmatrix} x_1, & x_2 \\ x_{N+1}, & x_{N+2} \\ \vdots & \vdots \\ x_{(\lceil M/N \rceil - 1)N+1}, & x_{(\lceil M/N \rceil - 1)N+2} \end{bmatrix} \quad (3)$$

The a phase rotation unit 13 multiplies a phase rotator that undergoes phase rotation at a prescribed angular velocity by each row of duplication data to obtain phase rotation data. Here, the rotator when the angular velocity is $2\pi g$ is represented in the manner indicated below.

$$C = \begin{bmatrix} e^{j(2\pi g \times 0 + \theta)} & \cdots & 0 \\ & e^{j(2\pi g \times 1 + \theta)} & \vdots \\ \vdots & & \ddots \\ 0 & \cdots & e^{j(2\pi g \times (\lceil M/N \rceil - 1) + \theta)} \end{bmatrix} \quad (4)$$

Here, $$e^{j\phi} = \cos\phi + j\sin\phi \quad (5)$$

and j represents a complex number. In addition, θ is the initial phase. The following explanation is based θ being zero. Here, in the case of rotating the phase of all rows of duplication data at the same angular velocity, the phase rotation data becomes the result of multiplying matrix (4) by matrix (3) starting from the left, and is represented by the following formula (6).

$$X_{rotated} = C X_{copied} \quad (6)$$

$$= \begin{bmatrix} x_1 e^{j(2\pi g \times 0)}, & x_2 e^{j(2\pi g \times 0)} \\ x_{N+1} e^{j(2\pi g \times 1)}, & x_{N+2} e^{j(2\pi g \times 1)} \\ \vdots & \vdots \\ x_{(\lceil M/N \rceil - 1)N+1} e^{j(2\pi g \times (\lceil M/N \rceil - 1))}, & x_{(\lceil M/N \rceil - 1)N+2} e^{j(2\pi g \times (\lceil M/N \rceil - 1))} \end{bmatrix}$$

Furthermore, although all duplication data is multiplied by the same rotator in formula (6), the data may also each be multiplied by separate and independent rotators. In this case, if the angular velocities of rotators corresponding to each row of formula (3) are taken to be $2\pi g_1$ and $2\pi g_2$, then phase rotation data becomes matrices obtained by coupling those vectors obtained by multiplying the rotator matrix (4) corresponding to angular velocity by each row vectors from the first row to the second row starting from the left side, and is represented in the manner indicated below.

$$X_{rotated} = \begin{bmatrix} x_1 e^{j(2\pi g_1 \times 0)}, & x_2 e^{j(2\pi g_2 \times 0)} \\ x_{N+1} e^{j(2\pi g_1 \times 1)}, & x_{N+2} e^{j(2\pi g_2 \times 1)} \\ \vdots & \vdots \\ x_{(\lceil M/N \rceil - 1)N+1} e^{j(2\pi g_1 \times (\lceil M/N \rceil - 1))}, & x_{(\lceil M/N \rceil - 1)N+2} e^{j(2\pi g_2 \times (\lceil M/N \rceil - 1))} \end{bmatrix} \quad (7)$$

The an inverse Fourier transform unit 14 is input with parallel data output from the serial-parallel conversion unit 11 and phase rotation data output from the phase rotation unit 13, subjects the input signals to reverse Fourier transform, and outputs the resulting inverse Fourier transform signals. Here, input signals are in the form of the following matrix obtained by coupling, for example, matrices $X_p$ and $X_{rotated}$ in the row direction.

$$X_{F,IN} = [X_p, X_{rotated}] \quad (8)$$

At this time, the input matrix size is given by the following:

$$\lceil M/N \rceil \times (N+2)$$

The an inverse Fourier transform unit 14 subjects the input matrices to inverse fast Fourier transform (IFFT). At this time, the size of the inverse Fourier transform is required to be larger than (N+2). For example, in the case of IFFT of size (N+2), by multiplying formula (8) by the following operator starting from the right side, $$F = \begin{bmatrix} e^{j2\pi\frac{0}{N+2}\cdot 0} & e^{j2\pi\frac{0}{N+2}\cdot 1} & \cdots & e^{j2\pi\frac{0}{N+2}\cdot(N+1)} \\ e^{j2\pi\frac{1}{N+2}\cdot 0} & e^{j2\pi\frac{1}{N+2}\cdot 1} & \cdots & e^{j2\pi\frac{1}{N+2}\cdot(N+1)} \\ \vdots & \vdots & \ddots & \vdots \\ e^{j2\pi\frac{N+1}{N+2}\cdot 0} & e^{j2\pi\frac{N+1}{N+2}\cdot 1} & \cdots & e^{j2\pi\frac{N+1}{N+2}\cdot(N+1)} \end{bmatrix} \quad (9)$$

the inverse Fourier transform signal is output in the manner indicated below.

$$X_{F,OUT} = X_{F,IN} \cdot F \quad (10)$$

Here, the inverse Fourier transform signal $X_{F,OUT}$ is a multi-carrier signal, and data of the kth row of the input signal matrix $X_{F,IN}$ is transmitted in the kth subcarrier. Furthermore, in the case of IFFT of a size larger than (N+2), IFFT is carried out after making the number of rows of the input signal matrix equal to the size of inverse Fourier transform by inserting a zero matrix.

Furthermore, although a matrix obtained by coupling matrices $X_p$ and $X_{rotated}$ was used for the input signal to the inverse Fourier transform unit 14 in the above-mentioned example, a form may also be employed in which, for example, matrix $X_{rotated}$ is inserted between a prescribed row of matrix $X_p$ and a row adjacent thereto. In this case, the input signal becomes, for example, as shown below.

$$X_{F,IN} = [X_p^{(1,n)}, X_{rotated}, X_p^{(n+1,N)}] \quad (11)$$

Furthermore, n is an integer equal to or less than (N−1), and $$X_p^{(m,l)} = \begin{bmatrix} x_m, & \cdots, & x_l \\ x_{N+m}, & \cdots, & x_{N+l} \\ \vdots & \cdots & \vdots \\ x_{(\lceil M/N \rceil - 1)N+m}, & \cdots, & x_{(\lceil M/N \rceil - 1)N+l} \end{bmatrix} \quad (12)$$

In addition, a form may also be employed in which matrix $X_{rotated}$ is divided into row vectors, and each row vector is inserted between a prescribed row of $X_p$ and a row adjacent thereto in the same manner as (11) above.

The GI insertion unit 15 duplicates all elements of a prescribed number of rows starting from the matrix farthest to the right (or farthest to the left) of the inverse Fourier transform signals, and by then coupling the duplicated elements to the inverse Fourier transform signals in the row direction starting from the left (or right), a guard interval (GI) is inserted to obtain a GI insertion signal. For example, if the length of the GI, namely the above-mentioned prescribed number of rows, is taken to be L, then the GI insertion signal becomes as indicated below.

$$X_{GI} = \begin{bmatrix} x_{1,N-L+3}^F & \cdots & x_{1,N+2}^F & x_{1,1}^F & \cdots & x_{1,N+2}^F \\ \vdots & \vdots & \vdots & \vdots & \vdots & \vdots \\ x_{\lceil M/N \rceil,N-L+3}^F & \cdots & x_{\lceil M/N \rceil,N+2}^F & x_{\lceil M/N \rceil,1}^F & \cdots & x_{\lceil M/N \rceil,N+2}^F \end{bmatrix} \quad (13)$$

provided that:

$$X_{F,OUT} = \begin{bmatrix} x_{1,1}^F & \cdots & x_{1,N+2}^F \\ \vdots & \ddots & \vdots \\ x_{\lceil M/N \rceil,1}^F & \cdots & x_{\lceil M/N \rceil,N+2}^F \end{bmatrix} \quad (14)$$

The parallel-series conversion unit 16 converts a matrix input in the form of a GI insertion signal to series data, and outputs a resulting transmission signal B. The transmission signal B is in the following form with respect to the GI insertion signal of formula (13).

$$S = [x_1^F x_2^F \ldots x_{\lceil M/N \rceil}^F] \quad (15)$$

Furthermore, $$x_k^F = [x_{k,N-L+3}^F \ldots x_{k,N+2}^F x_{k,1}^F \ldots x_{k,N+2}^F] \quad (16)$$

Furthermore, transmission signals are output in the form of signals on a time axis in order starting from the first element of formula (15) to the last $\lceil M/N \rceil (N+L+2)$th element. As a result, signals can be generated in which characteristics of cyclostationarity have been induced. Details of the induced cyclostationarity characteristics are described in a subsequent explanation of effects of the present embodiment.

[Operation Relating to Signal Generation Device]

Figure 2:
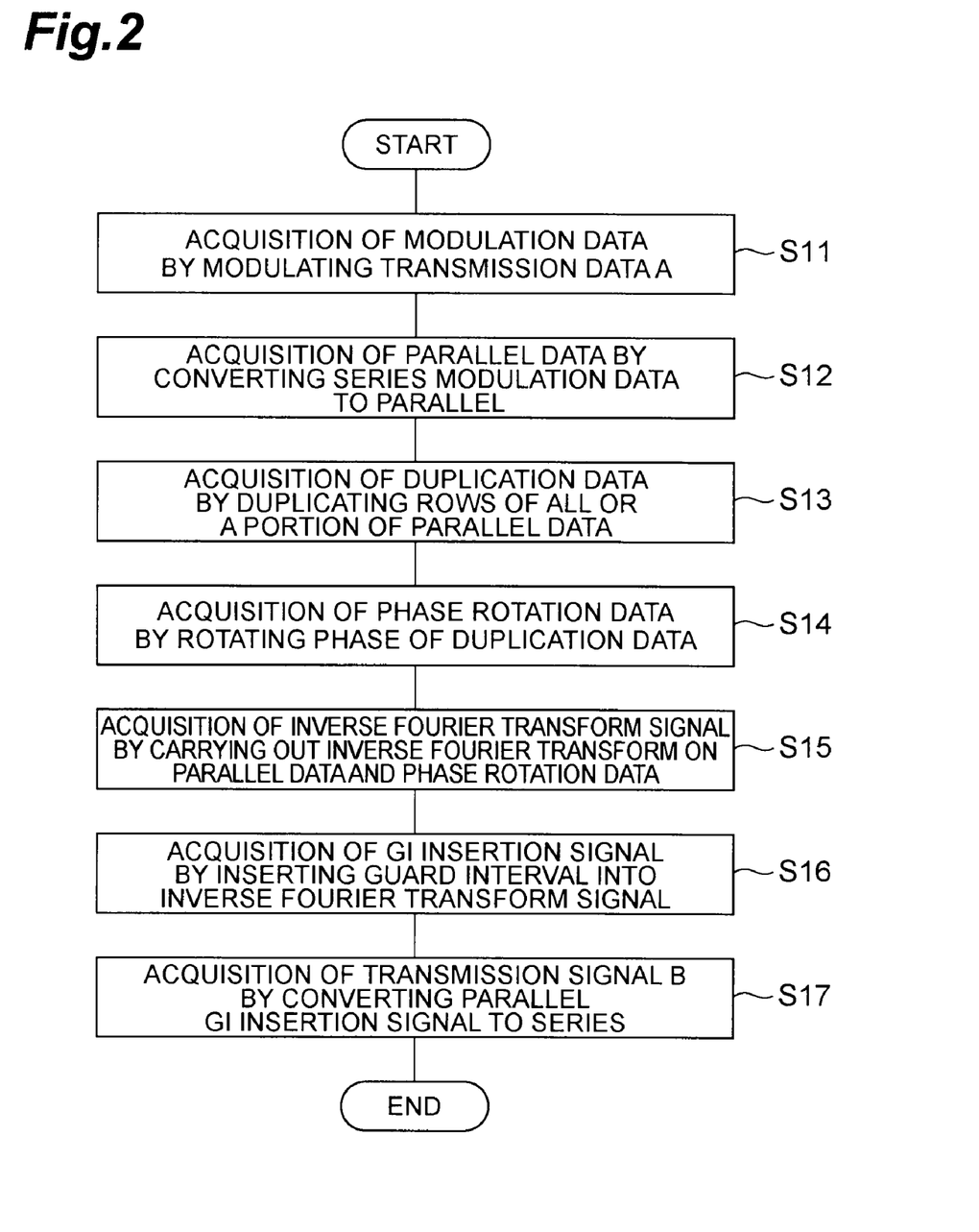
FIG. 2 is a flow chart showing the procedure of signal generation processing in a first embodiment.

Continuing, an explanation is provided of operation relating to the signal generation device 1 of the first embodiment (to be referred to as "signal generation operation"). FIG. 2 indicates the procedure relating to signal generation operation in the signal generation device 1.

In the induction of characteristics of cyclostationarity in signals during the course of the signal generation operation in the present embodiment, the modulation unit 10 of the signal generation device 1 first acquires modulation data by modulating transmission data A (S11 in FIG. 2). The modulation data is then input in series to the serial-parallel conversion unit 11. The a serial-parallel conversion unit 11 converts series modulation data to parallel to acquire parallel data (S12). Together with the parallel data being input to the duplication unit 12, the parallel data is also input to the inverse Fourier transform unit 14 via the duplication unit 12. The a duplication unit 12 then duplicates all or a portion of row data of the input parallel data to acquire duplication data (S13). The acquired duplication data is then input to the phase rotation unit 13. The a phase rotation unit 13 then rotates the signal phase of the duplication data by a prescribed angular velocity to acquire phase rotation data (S14). The acquired phase rotation data is then input to the inverse Fourier transform unit 14. The an inverse Fourier transform unit 14 carries out inverse fast Fourier transform (IFFT) on the input parallel data and phase rotation data to acquire an inverse Fourier transform signal (S15). The acquired inverse Fourier transform signal is then input to the GI insertion unit 15. The GI insertion unit 15 inserts a guard interval (GI) into the inverse Fourier transform signal to acquire a GI insertion signal (S16). The acquired GI insertion signal is then input in parallel to the parallel-series conversion unit 16. The parallel-series conversion unit 16 converts the GI insertion signal input in parallel to series followed by acquisition and output of a time-domain signal in the form of transmission signal B (S17). This completes processing related to signal generation operation.

[Effects of First Embodiment]

Continuing, an explanation is provided of effects of the first embodiment. A signal having characteristics of second-order cyclostationarity can be generated by the signal generation operation described above. Second-order cyclostationarity refers to a property mainly represented by statistics consisting of a second-order cyclic autocorrelation function (CAF) and spectral correlation density (SCD).

CAF for a signal x(t) is represented as follows:

$$R_x^\alpha(\tau) = \lim_{T\to\infty} \frac{1}{T}\int_{-T/2}^{T/2} x\left(t+\frac{\tau}{2}\right)x^*\left(t-\frac{\tau}{2}\right)e^{j2\pi\alpha t}dt \quad (17)$$

At this time, SCD becomes as indicated below.

$$S_x^\alpha(f) = \int_{-\infty}^{\infty} R_x^\alpha(\tau)e^{-j2\pi f\tau}d\tau \quad (18)$$

$$= \lim_{T\to\infty}\frac{1}{T}X_T\left(f+\frac{\alpha}{2}\right)X_T^*\left(f-\frac{\alpha}{2}\right)$$

Here, $\alpha$ represents cycle frequency and $\tau$ represents a lag parameter. In addition, $X_T(f)$ indicates the result of carrying out Fourier transform on the time signal x(t), and is represented in the following manner.

$$X_T(f) = \int_{-T/2}^{T/2} x(t)e^{-j2\pi ft}dt \quad (19)$$

In this manner, SCD can be perceived to be a frequency correlation. In addition, CAF can also be represented as indicated below.

$$R_x^\alpha(\tau) = \lim_{T\to\infty}\frac{1}{T}\int_{-\infty}^{\infty} X_T(f)X_T^*(f-\alpha)e^{j2\pi(f-\frac{\alpha}{2})\tau}df \quad (20)$$

On the basis of formulas (18) and (20), characteristics of second-order cyclostationarity can be understood to constitute a correlation between a signal and a signal resulting from shifting the frequency of that signal.

In the present invention, modulation data transmitted by all or a portion of subcarriers is duplicated, subjected to phase rotation and then transmitted by another subcarrier. Here, CAF and SCD are determined in the case in which, for example, a signal of a uth subcarrier is duplicated, subjected phase rotation at an angular velocity w=2πg [rad/symbol], and transmitted by an (m+u)th subcarrier.

The ith symbol transmitted by the uth subcarrier is assumed to be $a_i$. At this time, the transmission signal of the uth subcarrier subjected to Fourier transform is assumed to be A(f). In contrast, phase rotation is applied to the (m+u)th subcarrier, and the ith transmission symbol is $a_i e^{j2\pi gi}$. Here, $e^{j2\pi gi}$ is represented as shown below when using a continuous time t.

$$e^{j2\pi gi} = e^{j2\pi g[t/T_S]}, (i-1)T_S \leq t < iT_S \quad (21)$$

Here, $T_S$ is the one symbol time per subcarrier obtained by IFFT and GI insertion. At this time, from formula (21), $e^{j2\pi gi}$ is a function in which the frequency component ($g/T_s$) reaches a maximum in the frequency region. Consequently, the signal $a_i e^{j2\pi gi}$ transmitted by the (m+u)th subcarrier becomes a signal having as the main component thereof a component in which frequency of $a_i$ has been shifted by ($g/T_s$) on the frequency axis.

Here, the frequency interval between subcarriers is assumed to be Δf, and the carrier frequency of the uth subcarrier is assumed to be zero. At this time, when a frequency representation of a transmission signal composed of symbol rows transmitted by the uth subcarrier is assumed to be A(f), then A(f) becomes a signal centering on a frequency of 0. In contrast, in the (m+u)th subcarrier, a signal identical to the transmission signal of the uth subcarrier has a component shifted by ($g/T_s$) on the frequency axis. Consequently, a transmission signal in the (m+u)th subcarrier can be represented by (cA(f−$g/T_s$)+Δ). Here, c is the amplitude in the frequency component ($g/T_s$) of $e^{j2\pi gi}$, and Δ is a component originating in a component other than the frequency ($g/T_s$) generated in $e^{j2\pi gi}$. In the (m+u)th subcarrier, since frequency is shifted from the uth subcarrier by mΔf, by considering only signals of the uth subcarrier and the (m+u)th subcarrier, the transmission signal X(f) based on the central frequency of the uth subcarrier is as indicated below for a sufficient long observation time T.

$$X(f)=A(f)+A(f-g/T_S-m\Delta f)+\Delta \quad (22)$$

At this time, SCD is obtained by substituting formula (22) into formula (18) and becomes as indicated below:

$$S_x^\alpha(f) = \left\{A\left(f+\frac{\alpha}{2}\right)+A\left(f+\frac{\alpha}{2}-\frac{g}{T_s}-m\Delta f\right)+\Delta\right\}\times \quad (23)$$

$$\left\{A\left(f-\frac{\alpha}{2}\right)+A\left(f-\frac{\alpha}{2}-\frac{g}{T_s}-m\Delta f\right)+\Delta\right\}^*$$

$$= A\left(f+\frac{\alpha}{2}\right)+A^*\left(f-\frac{\alpha}{2}-\frac{g}{T_s}-m\Delta f\right)+$$

$$A^*\left(f-\frac{\alpha}{2}\right)A\left(f+\frac{\alpha}{2}-\frac{g}{T_s}-m\Delta f\right)+\Delta'$$

wherein, $$\Delta' = \left\{\begin{array}{l} A\left(f+\frac{\alpha}{2}\right)A^*\left(f-\frac{\alpha}{2}\right)+ \\ A\left(f+\frac{\alpha}{2}-\frac{g}{T_s}-m\Delta f\right)A^*\left(f-\frac{\alpha}{2}-\frac{g}{T_s}-m\Delta f\right)+ \\ \Delta\left\{A\left(f-\frac{\alpha}{2}\right)+A\left(f-\frac{\alpha}{2}-\frac{g}{T_s}-m\Delta f\right)+\Delta\right\}^* \end{array}\right\} \quad (24)$$

Here, if β=γ for the parameters β and γ, then (A(f+β)×A*(f+γ)) is not zero for an arbitrary f, and in other cases, is zero or an extremely small value. Thus, from formula (23), in the case of (α/2=−α/2−$g/T_s$−mΔf) or (−α/2=α/2−$g/T_s$−mΔf), namely in the case of (α=−$g/T_s$−mΔf) or (α=$g/T_s$+mΔf), SCD can be seen to have a peak for an arbitrary f. Similarly, by substituting formula (22) into formula (20), when τ=0, for example, CAF can also be seen to have peak in (α=−$g/T_s$−mΔf) or (α=$g/T_s$+mΔf). In this manner, by setting the rotation rate of a signal in the phase rotation unit (namely, setting g), the locations of the appearance of a peak for CAF and SCD can be allowed to move, thereby making it possible to induce second-order cyclostationarity characteristics as desired.

Here, since a transmission symbol is input to IFFT after rotating the phase thereof in the present invention, orthogonality between subcarriers can be maintained in symbol units. Thus, a conventional demodulation device is sufficient for signal reception (however, a dedicated calculation unit is required to extract cyclostationarity characteristics). Moreover, since the present invention induces cyclostationarity by duplicating a transmission signal, at least one subcarrier is enough for inducing cyclstationarity and cyclostationarity can be thus induced with little overhead. In addition, since it is not necessary to occupy subcarriers for inducing cyclostationarity at all times within a frame, overhead can be further reduced by limiting the amount of time for inducing cyclostationarity.

Furthermore, $e^{j2\pi gi}$ is represented by the following manner by carrying out Fourier transform on formula (21) when the number of transmission symbols is V.

$$\int_0^{VTs} e^{j2\pi g[t/Ts]} e^{-j2\pi ft} dt = \frac{C(f)\sin(\pi fTs)}{\pi f} \times \frac{\sin(\pi V(g-fTs))}{\sin(\pi(g-fTs))} \quad (25)$$

As a result, a peak can be determined to be present in $f=g/T_s$ as previously described. In contrast, when $f=(g\pm n/V)/T_s$ (wherein, n is an integer), for example, formula (25) becomes zero. In the case of having used this to determine g for a certain transmission signal, by multiplying the phase rotator $e^{j2\pi gi}$ of the angular velocity $2\pi g'$ so that a peak occurs for $f=(g-1N)/T_s$, the peak location can be made to be orthogonal to other transmission signals, thereby enabling effective information transmission using cyclostationarity.

[Variations of Signal Generation Device of First Embodiment]

The following provides an explanation of variations of the signal generation device in the first embodiment.

Figure 3:
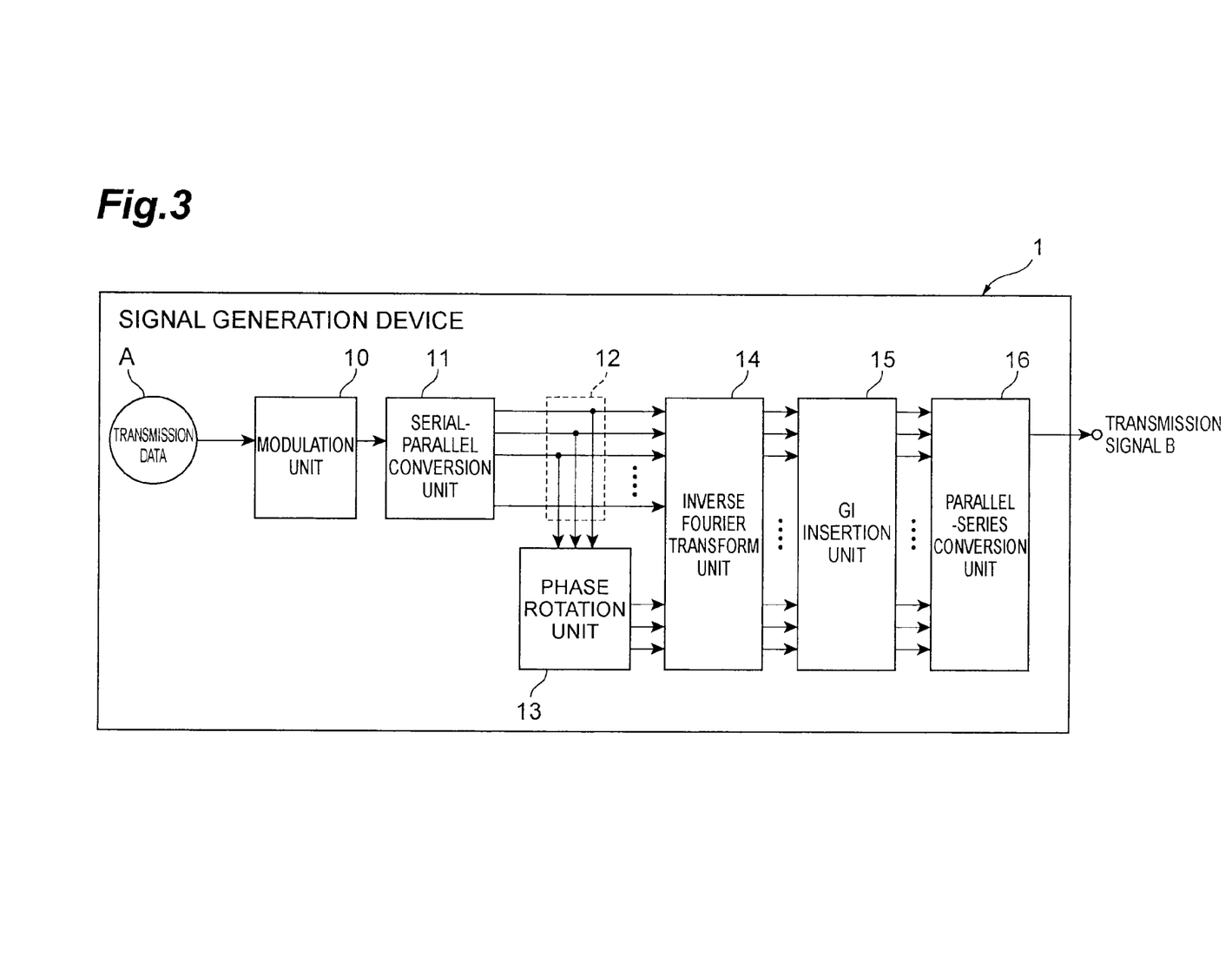
FIG. 3 is a block diagram representing the functional configuration of a first variation of the signal generation device of FIG. 1.

A first variation is configured such that in the duplication unit 12, that rows targeted for duplication in input parallel data are fixed, and symbols of the row targeted for duplication are always input to the phase rotation unit 13. In this case, a portion of the rows of parallel data are always input from the duplication unit 12 to the phase rotation unit 13. Consequently, the duplication unit 12 can be simplified to a configuration in which rows of parallel data targeted for duplication are only distributed by wiring and the like. FIG. 3 shows a functional block diagram of the signal generation device 1 in the case of replacing the duplication unit 12 with a simple wiring branch. Furthermore, in the case of simply replacing the duplication unit 12 with a simple wiring branch as shown in FIG. 3, since there is the possibility of an imbalance occurring in electric power between symbols input to the inverse Fourier transform unit 14, unit for balancing electric power between symbols input to the inverse Fourier transform unit 14 may be inserted between the duplication unit 12 and the inverse Fourier transform unit 14 (or between the duplication unit 12 and the phase rotation unit 13) to prevent this imbalance. In addition, instead of making the duplication unit 12 a simple wiring branch, a distributor and the like may also be provided in the duplication unit 12 so that an imbalance in electric power as described above does not occur.

Figure 4:
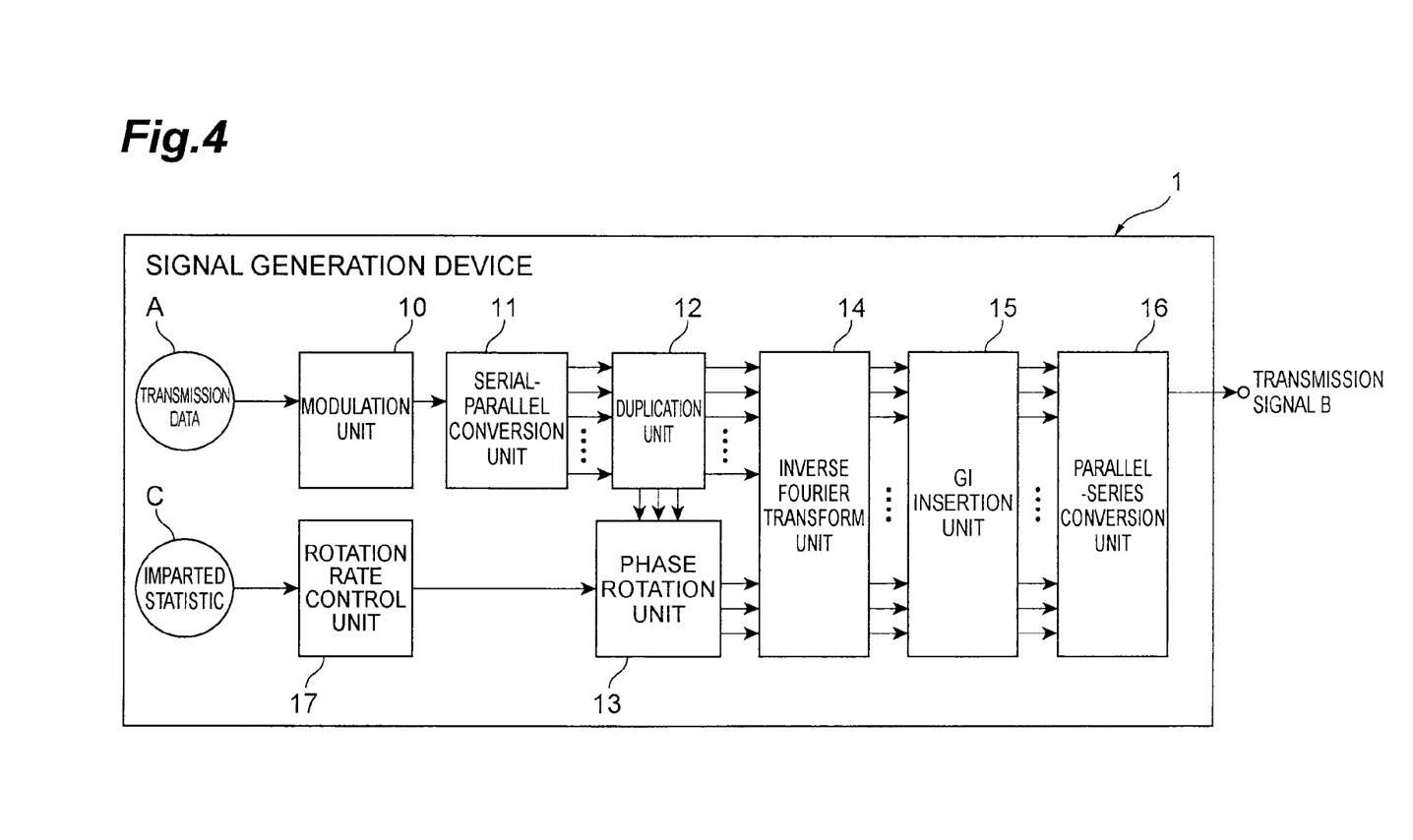
FIG. 4 is a block diagram representing the functional configuration of a second variation of the signal generation device of FIG. 1.

A second variation makes it possible to vary cyclostationarity characteristics that appear by varying the angular velocity of phase rotation in the phase rotation unit 13 using the passage of a fixed amount of time such as a frame time or a control signal from the outside. More specifically, as shown in FIG. 4, a rotation rate control unit 17 is provided in the signal generation device 1, the rotation rate control unit 17 calculates a phase rotation rate in accordance with information of an imparted statistic C determined in advance or determined from the outside in advance in the signal generation device 1, and the phase rotation unit 13 controls the phase rotation rate of a signal based on the calculation result. At this time, if data of a uth subcarrier is duplicated, and that duplication data in which phase rotation is applied at an angular velocity of phase rotation of $2\pi g$ ($0 \leq g < 1$) is transmitted in the (m+u)th subcarrier, then SCD or CAF has a peak in ($\alpha=-g/T_s-m\Delta f$) or ($\alpha=g/T_s+m\Delta f$). Consequently, by setting $\alpha$ for which a peak of SCD or CAF is desired to appear and making the parameter g such that $g=(\pm\alpha+m\Delta f)T_s$, characteristics of SCD or CAF can be made to appear for a desired $\alpha$.

Figure 5:
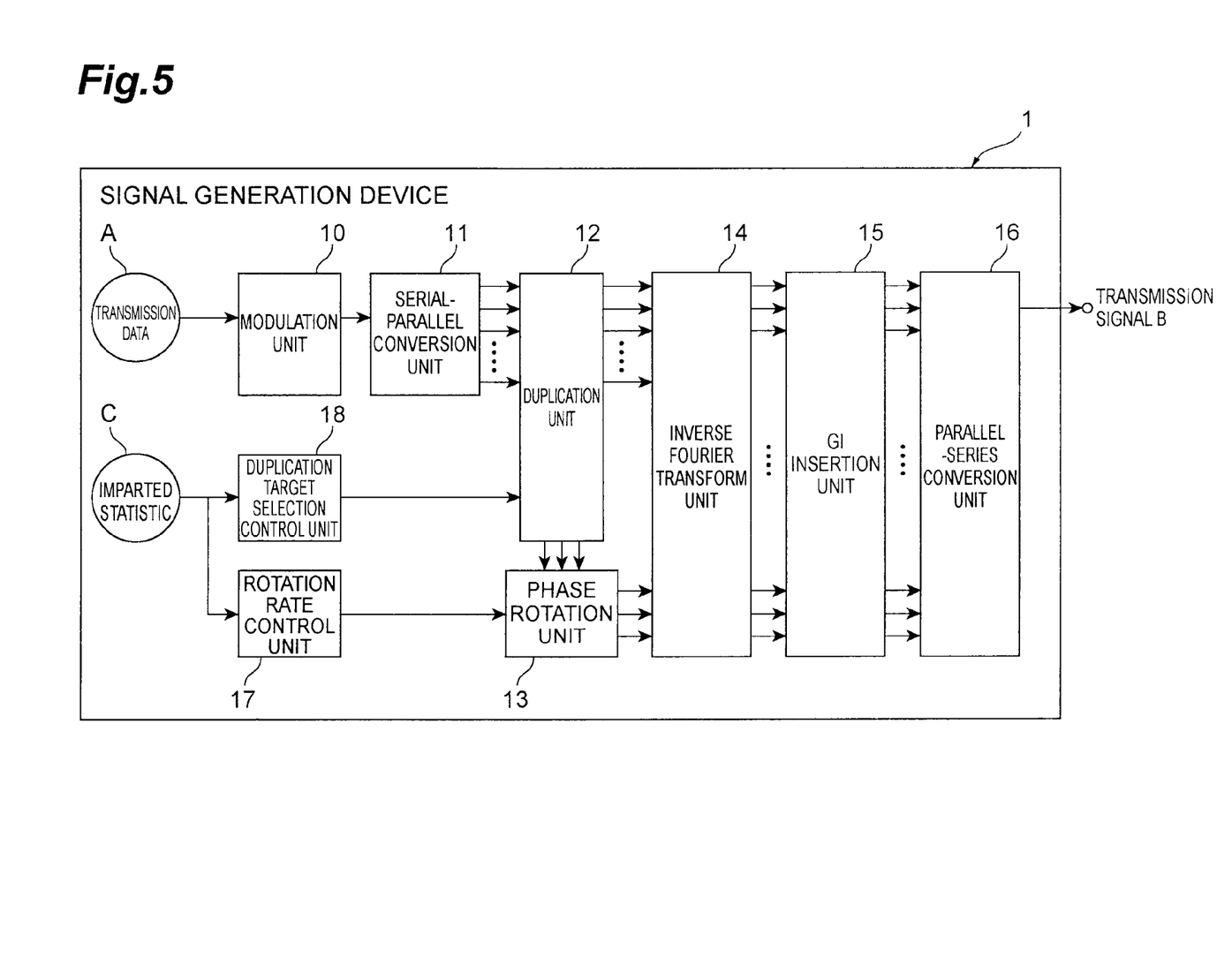
FIG. 5 is a block diagram representing the functional configuration of a third variation of the signal generation device of FIG. 1.

A third variation makes it possible to vary cyclostationarity characteristics that appear by varying rows of parallel data targeted for duplication in the duplication unit 12 using the passage of a fixed amount of time such as a frame time or a control signal from the outside. More specifically, as shown in FIG. 5, a duplication target selection control unit 18 is further provided in the signal generation device 1, the duplication target selection control unit 18 calculates those rows of parallel data targeted for duplication in accordance with information of an imparted statistic C determined in advance or determined from the outside in advance in the signal generation device 1, and the duplication unit 12 selects the duplication target based on the calculation result serving as control information for selection of duplication targets. At this time, if data of the uth subcarrier is duplicated, and duplication data in which phase rotation is applied at an angular velocity of phase rotation of $2\pi g$ is transmitted in the mth subcarrier, then SCD or CAF has a peak in ($\alpha=-g/T_s-(m-u)\Delta f$) or ($\alpha=g/T_s+(m-u)\Delta f$). According to this, if the subcarrier that transmits the duplication target is determined to be the mth subcarrier, by varying parameters g ($0 \leq g < 1$) and u ($0 \leq u \leq M-1$, provided that M is the total number of subcarriers in the transmission signal and $u \neq m$), SCD and CAF can be made to appear for a desired $\alpha$. Furthermore, in a third variation, the rotation rate control unit 17 of FIG. 5 is not an essential constituent.

Second Embodiment

The following provides an explanation of a signal generation device in a second embodiment.

Figure 6:
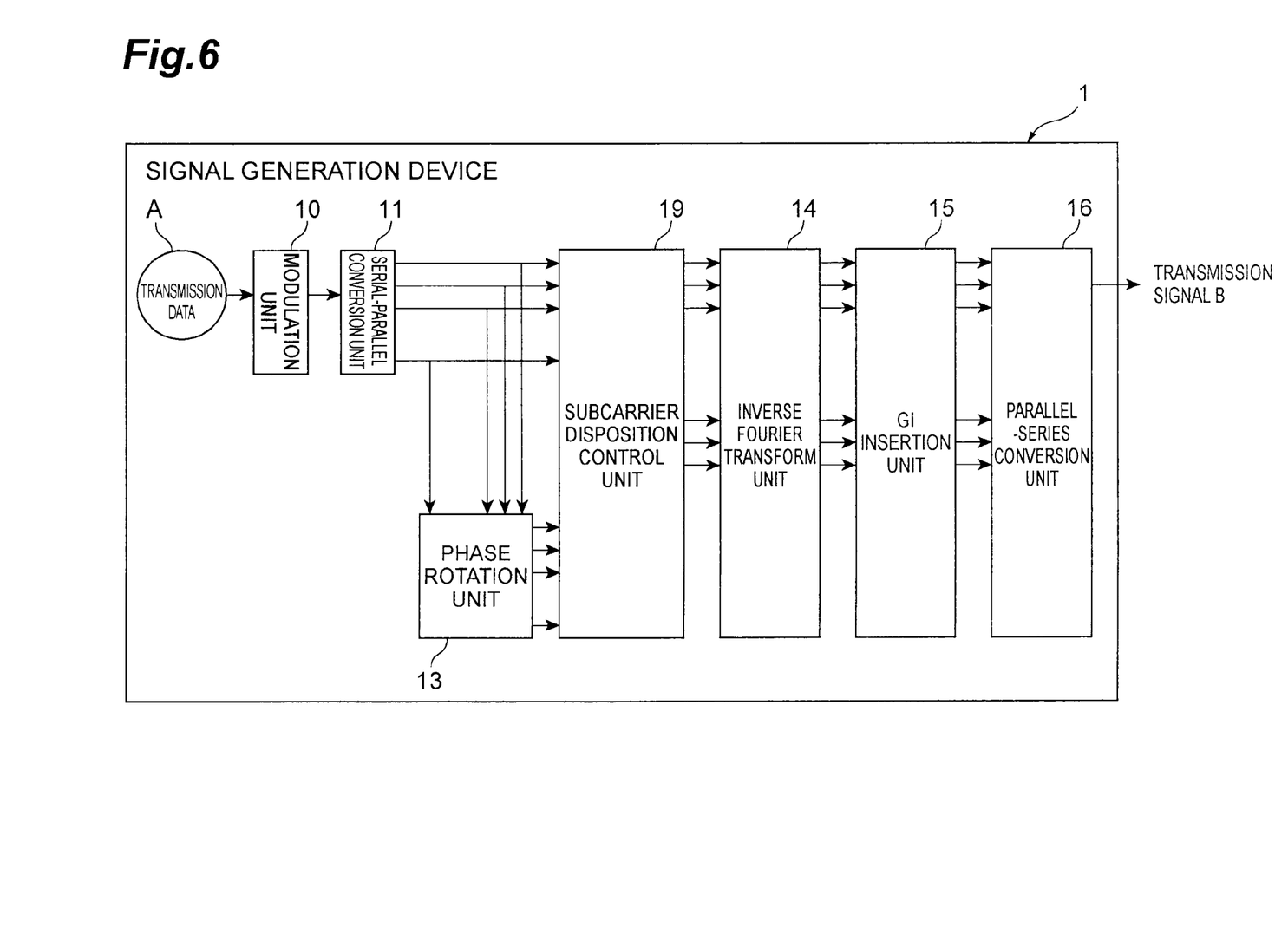
FIG. 6 is a block diagram representing the functional configuration of a signal generation device in a second embodiment.

Although the signal generation device 1 in the second embodiment shown in FIG. 6 has nearly the same configuration as the signal generation device in the previously described first embodiment, it differs in the manner described below. The signal generation device 1 in the second embodiment is not provided with the duplication unit 12, and instead all parallel data obtained from the serial-parallel conversion unit 11 is input to the phase rotation unit 13, and the phase rotation unit 13 rotates the phases of signal points for all parallel data at a prescribed rate to acquire phase rotation data. In addition, the signal generation device 1 is provided with a subcarrier disposition control unit 19, and this a subcarrier disposition control unit 19 selects all or a portion of phase rotation data input from the phase rotation unit 13, disposes the selected phase rotation data and parallel data obtained from the serial-parallel conversion unit 11 to each subcarrier, acquires disposed parallel data and outputs the data to the inverse Fourier transform unit 14.

Figure 7:
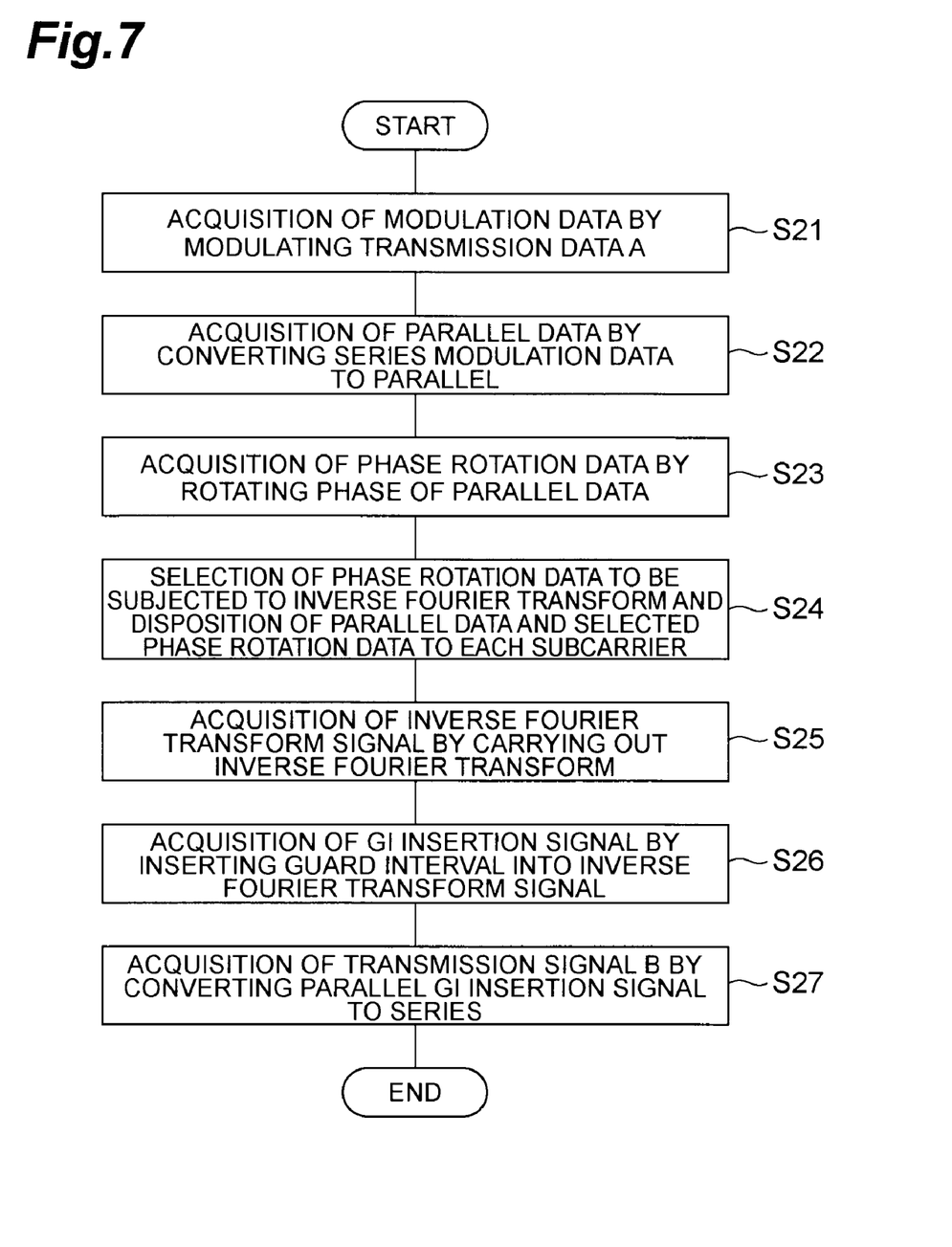
FIG. 7 is a flow chart showing the procedure of signal generation processing in a second embodiment.

Continuing, an explanation is provided of signal generation operation relating to the signal generation device 1 of the second embodiment. FIG. 7 shows the procedure relating to signal generation operation in the signal generation device 1 of the second embodiment. In the induction of characteristics of cyclostationarity in signals during the course of the signal generation operation in the second embodiment, the modulation unit 10 of the signal generation device 1 first acquires modulation data by modulating transmission data A (S21 in FIG. 7). The modulation data is then input in series to the serial-parallel conversion unit 11. The a serial-parallel conversion unit 11 converts series modulation data to parallel to acquire parallel data (S22). All acquired parallel data is respectively input to the phase rotation unit 13 and the subcarrier disposition control unit 19. The a phase rotation unit 13 rotates the phase of the parallel data signals at a prescribed angular velocity to acquire phase rotation data (S23). The acquired phase rotation data is then input to the subcarrier disposition control unit 19. The a subcarrier disposition control unit 19 selects all or a portion of the input phase rotation data to undergo inverse Fourier transform, and disposes the selected phase rotation data and parallel data acquired by the serial-parallel conversion unit 11 to each subcarrier to acquire disposed parallel data (S24). The acquired disposed parallel data is then input to the inverse Fourier transform unit 14. The an inverse Fourier transform unit 14 carries out inverse fast Fourier transform (IFFT) on the input disposed parallel data to acquire an inverse Fourier transform signal (S25). The acquired inverse Fourier transform signal is then input to the GI insertion unit 15. The GI insertion unit 15 inserts a guard interval (GI) into the inverse Fourier transform signal to acquire a GI insertion signal (S26). The acquired GI insertion signal is then input in parallel to the parallel-series conversion unit 16. The parallel-series conversion unit 16 converts the GI insertion signal input in parallel to series followed by acquisition and output of a time-domain signal in the form of transmission signal B (S27). This completes processing related to signal generation operation.

The signal generation device 1 of the second embodiment as described above is configured such that all parallel data acquired with the serial-parallel conversion unit 11 and phase rotation data acquired with the phase rotation unit 13 is input by the subcarrier disposition control unit 19, data to be input to the inverse Fourier transform unit 14 is selected from the phase rotation data, and the selected phase rotation data and the above-mentioned parallel data are disposed to each subcarrier. According to this configuration, disposition of phase rotation data and parallel data can be flexibly altered, enabling a where the peak of SCD or CAF appears to be set as desired.

Figure 8:
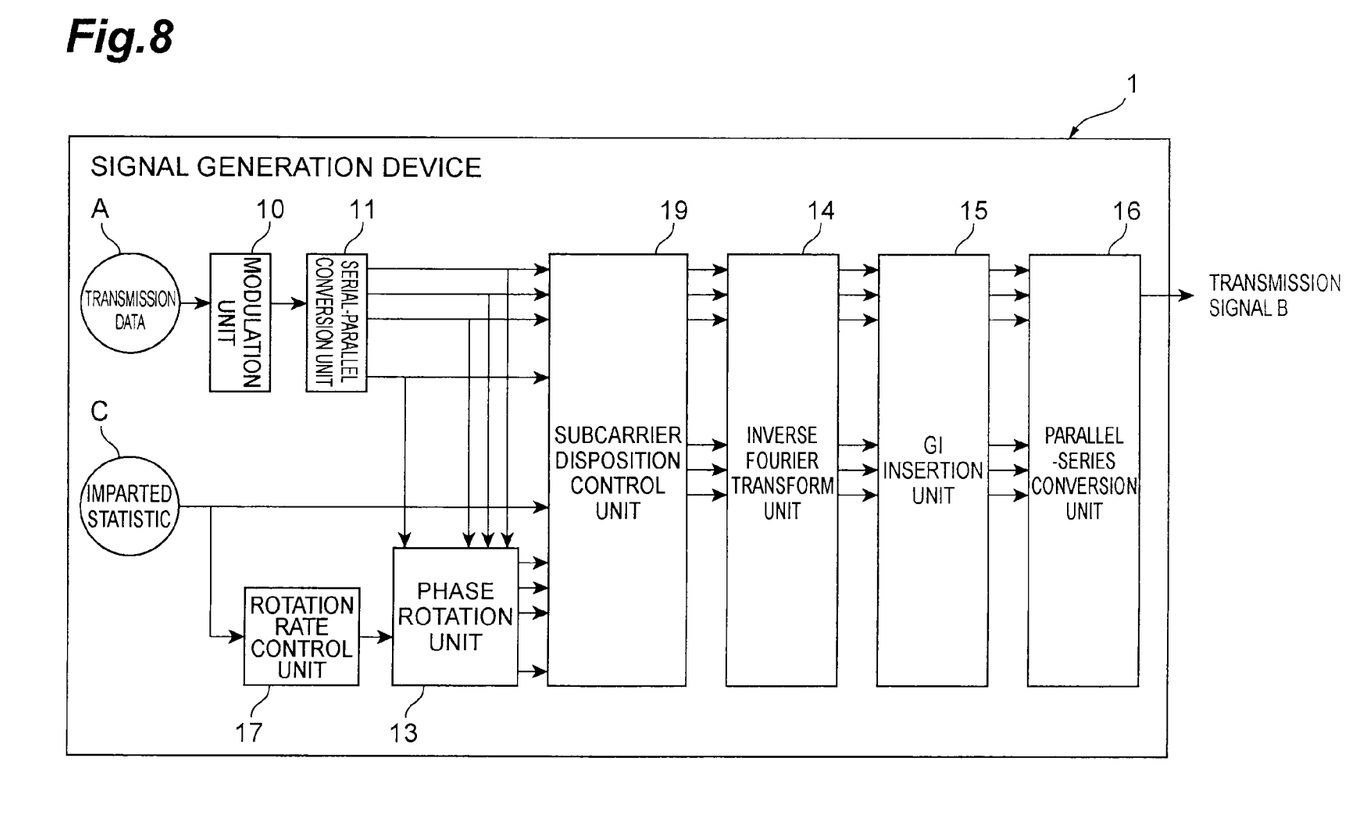
FIG. 8 is a block diagram representing the functional configuration of a variation of the signal generation device of FIG. 6.

Furthermore, in the signal generation device 1 of the second embodiment, by varying the angular velocity of phase rotation in the phase rotation unit 13 in the same manner as in the second variation of the previously described first embodiment, cyclostationarity characteristics that appear may be varied using the passage of a fixed amount of time such as a frame time or a control signal from the outside. For example, as shown in FIG. 8, the rotation rate control unit 17 is provided in the signal generation device 1, the rotation rate control unit 17 calculates a phase rotation rate in accordance with information of an imparted statistic C determined in advance or determined from the outside in advance in the signal generation device 1, and the signal rotation unit 13 controls the phase rotation rate of a signal based on that calculation result.

Figure 9:
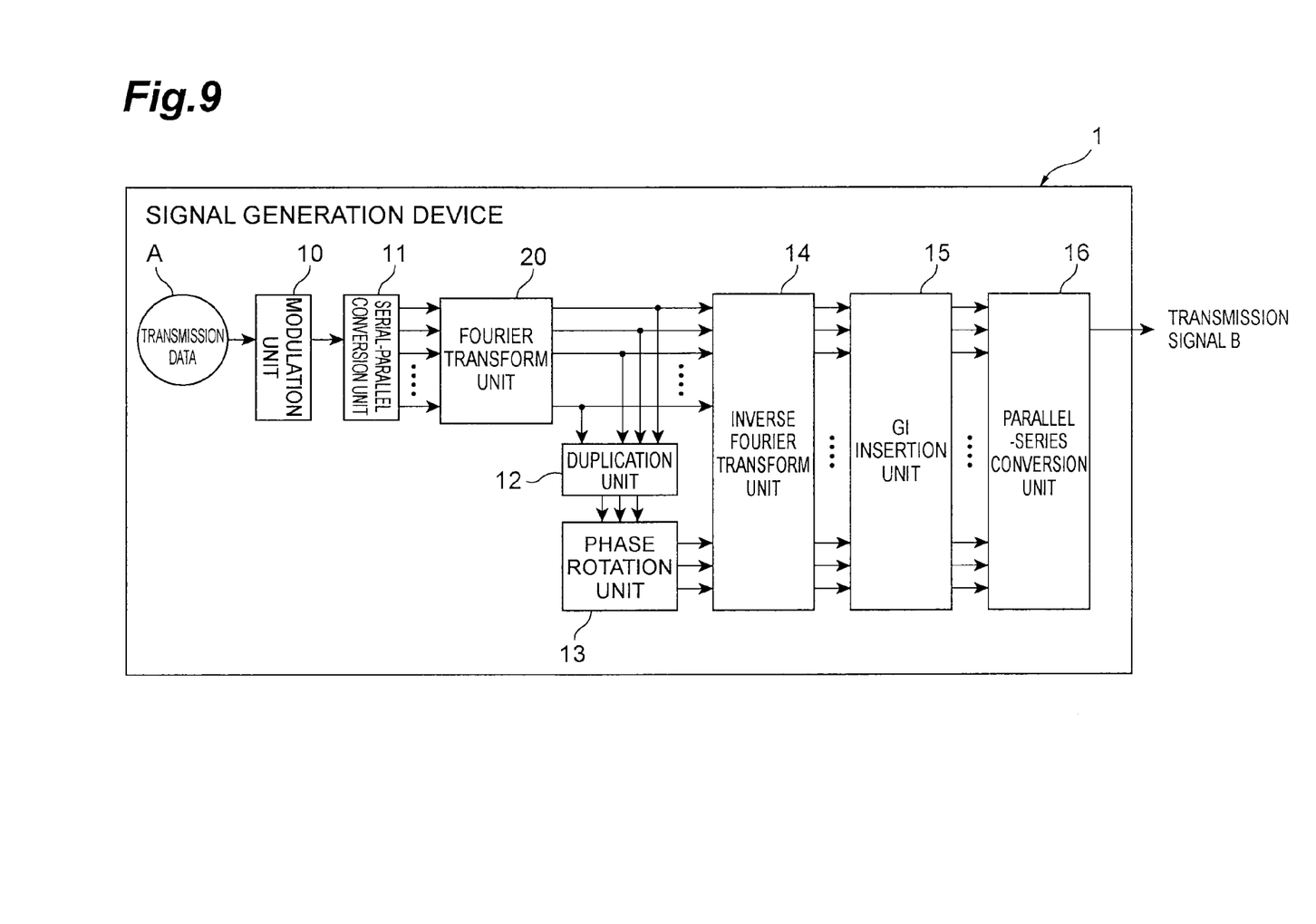
FIG. 9 is a block diagram representing the functional configuration of a signal generation device in the case of using the SC-FDMA method.

However, although the above-mentioned first and second embodiments disclose examples of OFDM systems in which parallel data acquired by the serial-parallel conversion unit 11 is directly inserted into the inverse Fourier transform unit 14, an OFDM system is not required provided the signal generation unit uses inverse Fourier transform. For example, the present invention can also be applied to a single-carrier FDMA (SC-FDMA) system. In this case, in the signal generation device 1 shown in FIG. 9, a Fourier transform unit 20 is provided on the output side of the serial-parallel conversion unit 11, parallel data obtained with the serial-parallel conversion unit 11 is subjected to Fourier transform by the Fourier transform unit 20, and the duplication unit 12 duplicates data that has undergone the Fourier transform and inputs that data to the phase rotation unit 13. The a phase rotation unit 13 rotates the phase of the duplicated Fourier transformed data at a prescribed rotation rate and inputs that data in the form of phase rotation data to the inverse Fourier transform unit 14. The an inverse Fourier transform unit 14 uses the phase rotation data input from the phase rotation unit 13 and the Fourier transformed data input from the Fourier transform unit 20 as an input signal, and carries out inverse fast Fourier transform (IFFT) on that input signal to acquire an inverse Fourier transform signal. Subsequently, in the same manner as in the first and second embodiments, the inverse Fourier transform signal is inserted with a guard interval (GI) by the GI insertion unit 15 to obtain a GI insertion signal, and the GI insertion signal input in parallel to the parallel-series conversion unit 16 is converted to series by the parallel-series conversion unit 16 and then output as a time-domain signal in the form of a transmission signal B. As has been described above, SCD or CAF characteristics can be similarly induced in SC-FDMA system signals by employing the configuration shown in FIG. 9.

Figure 10:
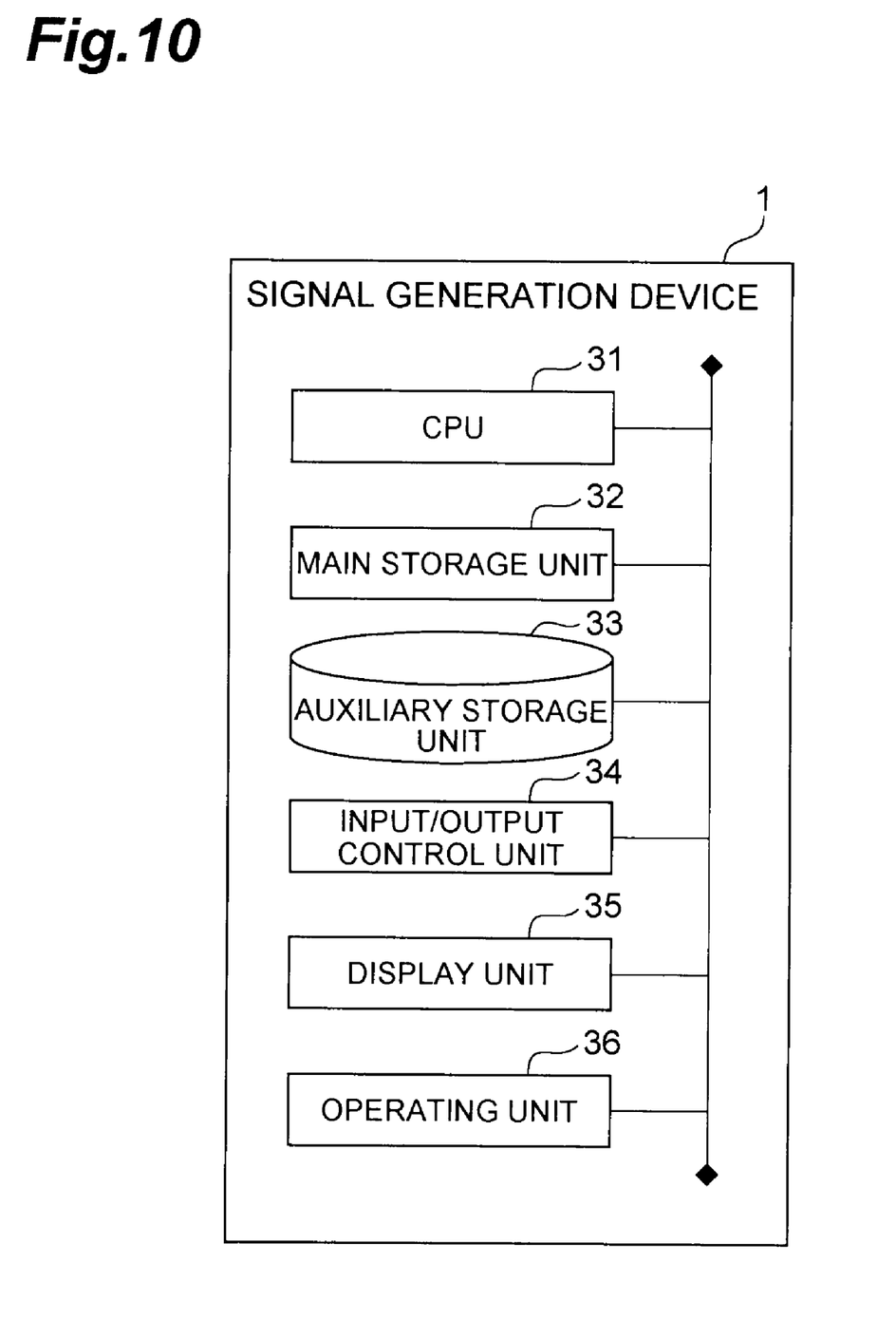
FIG. 10 is a block diagram representing an example of the hardware configuration of signal generation devices in first and second embodiments.

Furthermore, hardware of the signal generation device 1 in the first embodiment or second embodiment can be configured by a computer system or other arbitrary device capable of storing data. For example, as shown in FIG. 10, the signal generation device 1 can employ a configuration provided with a CPU 31 that executes an operating system or application program and the like, a main storage unit 32 composed of ROM and RAM, an auxiliary storage unit 33 composed of non-volatile memory and the like, an input-output control unit 34 that controls exchange of data with the outside, a display unit 35 composed of a monitor and the like, and an operating unit 36 composed of keys for entering letters and numbers and for instructing execution.

The disclosure of Japanese Patent Application No. 2008-309121 filed on Dec. 3, 2008 including specification, drawings and claims is incorporated herein by reference in its entirety.

What is claimed is:

1. A signal generation device that generates signals using an inverse Fourier transform, comprising:
    a modulation unit configured to modulate transmission data to obtain modulation data;
    a serial-parallel conversion unit configured to convert the modulation data input in series from the modulation unit to parallel data of a prescribed size smaller than the size of the inverse Fourier transform;
    a duplication unit configured to select and duplicate all or a portion of the parallel data obtained from the serial-parallel conversion unit, to obtain duplication data;
    a phase rotation unit configured to rotate the phase of a signal point at a prescribed rate for the duplication data, to obtain phase rotation data; and
    an inverse Fourier transform unit configured to carry out the inverse Fourier transform on the parallel data obtained from the serial-parallel conversion unit and the phase rotation data obtained from the phase rotation unit.

2. The signal generation device according to claim 1, further comprising a rotation rate control unit configured to control the rate of rotation at which the phase of the signal point is rotated by the phase rotation unit.

3. The signal generation device according to claim 1, further comprising a duplication target selection control unit configured to control selection of the parallel data targeted for duplication by the duplication unit.

4. A signal generation device that generates signals using an inverse Fourier transform, comprising:
- a modulation unit configured to modulate transmission data to obtain modulation data;
- a serial-parallel conversion unit configured to convert the modulation data input in series from the modulation unit to parallel data of a prescribed size smaller than the size of the inverse Fourier transform;
- a phase rotation unit configured to rotate the phase of a signal point at a prescribed rate for all of the parallel data obtained from the serial-parallel conversion unit, to obtain phase rotation data;
- a subcarrier disposition control unit configured to select all or a portion of the phase rotation data and configured to dispose the selected phase rotation data and the parallel data obtained from the serial-parallel conversion unit to each subcarrier, to obtain disposed parallel data; and
- an inverse Fourier transform unit configured to carry out the inverse Fourier transform on the disposed parallel data.

5. The signal generation device according to claim 4, further comprising a rotation rate control unit configured to control the rate of rotation at which the phase of the signal point is rotated by the phase rotation unit.

6. A signal generation method executed by a signal generation device that generates signals using an inverse Fourier transform, comprising the steps of:
- modulating transmission data to obtain modulation data;
- converting the modulation data input in series to parallel data of a prescribed size smaller than the size of the inverse Fourier transform;
- selecting and duplicating all or a portion of the parallel data to obtain duplication data;
- rotating the phase of a signal point at a prescribed rate for the duplication data, to obtain phase rotation data; and
- carrying out the inverse Fourier transform on the parallel data and the phase rotation data.

7. A signal generation method executed by a signal generation device that generates signals using an inverse Fourier transform, comprising the steps of:
- modulating transmission data to obtain modulation data;
- converting the modulation data input in series to parallel data of a prescribed size smaller than the size of the inverse Fourier transform;
- rotating the phase of a signal point at a prescribed rate for all of the parallel data, to obtain phase rotation data;
- selecting all or a portion of the phase rotation data and disposing the selected phase rotation data and the parallel data to each subcarrier, to obtain disposed parallel data; and
- carrying out the inverse Fourier transform on the disposed parallel data.

* * * * *